(12) United States Patent
Tatsumi

(10) Patent No.: US 10,855,812 B1
(45) Date of Patent: Dec. 1, 2020

(54) AUTOMATED IDENTIFICATION OF SERVICE BOUNDARIES BASED ON SYSTEM FOCUS OPTIMIZATION USING DISTRIBUTED TRACING DATA

(71) Applicant: Capital One Services, LLC, McLean, VA (US)

(72) Inventor: Noriaki Tatsumi, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/699,917

(22) Filed: Dec. 2, 2019

(51) Int. Cl.
| | | |
|---|---|---|
| *H04L 12/66* | (2006.01) | |
| *H04L 29/06* | (2006.01) | |
| *H04L 29/08* | (2006.01) | |

(52) U.S. Cl.
CPC .............. *H04L 67/42* (2013.01); *H04L 12/66* (2013.01); *H04L 67/02* (2013.01); *H04L 67/147* (2013.01); *H04L 67/16* (2013.01); *H04L 67/28* (2013.01); *H04L 67/32* (2013.01); *H04L 67/34* (2013.01)

(58) Field of Classification Search
CPC . H04L 41/5032; H04L 41/5045; H04L 67/30; H04L 69/40; H04L 41/5035; H04L 67/42; H04L 12/66; H04L 67/02; H04L 67/147; H04L 67/16; H04L 67/28; H04L 67/32; H04L 67/34; G06F 16/9038; G06F 21/6218; G06F 11/3688; G06F 11/3692; G06F 11/3684
See application file for complete search history.

(56) References Cited

U.S. PATENT DOCUMENTS

| | | | |
|---|---|---|---|
| 7,017,084 B2 | 3/2006 | Ng et al. | |
| 9,021,447 B2 | 4/2015 | Krajec et al. | |
| 9,135,145 B2 | 9/2015 | Voccio et al. | |
| 9,189,355 B1 * | 11/2015 | Moturu | G06F 11/3495 |
| 9,300,577 B2 * | 3/2016 | Uluderya | G06F 9/5027 |
| 2016/0105350 A1 | 4/2016 | Greifeneder et al. | |
| 2018/0316568 A1 | 11/2018 | Gill et al. | |
| 2019/0155721 A1 * | 5/2019 | Reeve | G06K 9/6219 |
| 2019/0294636 A1 * | 9/2019 | Albrecht | G06Q 20/389 |

\* cited by examiner

*Primary Examiner* — Hanh N Nguyen
(74) *Attorney, Agent, or Firm* — Sterne, Kessler, Goldstein & Fox P.L.L.C.

(57) ABSTRACT

A method for microservices architecture optimization is disclosed. The method includes receiving a first application request message at a gateway service, and generating a first client request message, by the gateway service, based on the first application request message. The first client request message may have a customized header comprising an identification of the gateway service. The method may include forwarding the first client request message from the gateway service to a first service of a plurality of services, and the first service updating the customized header of the first client request message to add an identification of the first service. The method includes generating, at the first service, a first client response message comprising the customized header, and generating, at the gateway service, a deployment scheme for a subset of services of the plurality of services based on the customized header of the first client response message. The deployment scheme may utilize an application specific criteria.

20 Claims, 4 Drawing Sheets

AUTOMATED IDENTIFICATION OF SERVICE BOUNDARIES BASED ON SYSTEM FOCUS OPTIMIZATION USING DISTRIBUTED TRACING DATA

BACKGROUND

Software microservices architecture (SMA) is a variant of service-oriented architecture (SOA). In SOA, software service design, development, delivery, and deployment are based on modules that each may be developed and deployed as independent systems. The modules in the SOA, therefore, offer the benefit of software agility because each module may be developed, deployed, and operated independently from other modules. Additionally, versioning and scaling of the modules based on changed requirements may be addressed independently without affecting other modules. Thus, SMA is a collection of loosely coupled services. The loosely coupled services may use protocols that are lightweight. Since each service is a module capable of being developed and deployed independently, the SMA may improve parallel development. Thus, it reduces time from lab to market.

The SMA often requires various services to communicate over a network using protocols such as hypertext transfer protocol (HTTP), etc. Therefore, the performance of the network and the microservices may be adversely affected due to network latency and message processing time in comparison with services implemented as a monolithic service process. Accordingly, if services were deployed without reviewing how various services interact with each other, a messaging overhead over the network and network latency would severely degrade the network performance. Thus, it is important to know which microservices should be coupled together and which microservices should be decoupled to reduce the messaging overhead and network latency to increase performance of the microservices and the network.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are a method, a system, and a computer program product embodiments, and/or combinations and sub-combinations thereof, for automated identification of service boundaries of various services of a software microservices architecture (SMA). In particularly, this disclosure is related to identification of boundaries of services of SMA based on system focus optimization using distributed tracing data.

Various embodiments of this disclosure will now be discussed with respect to the corresponding figures.

Figure 1:
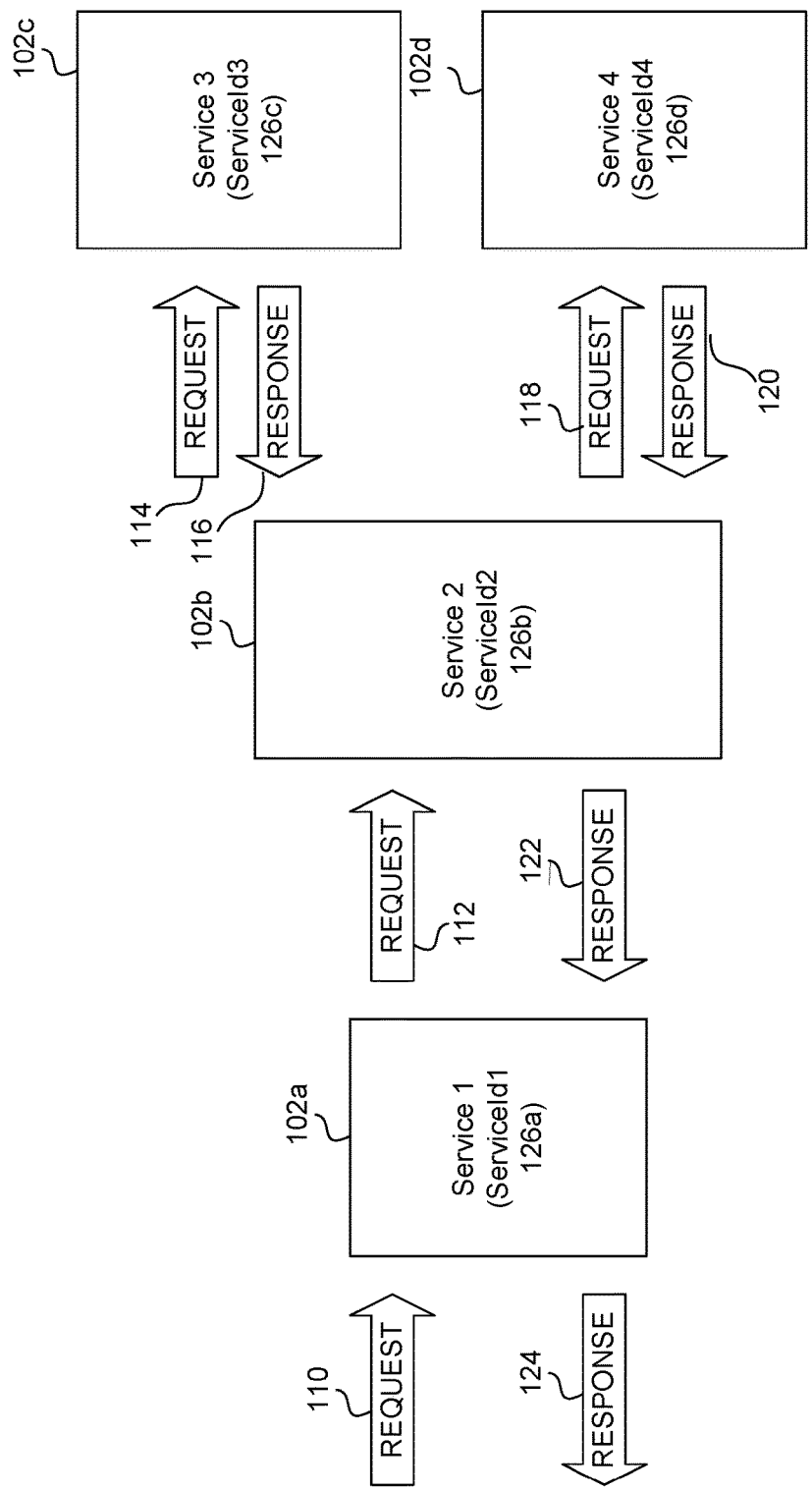
FIG. 1 illustrates an exemplary microservices flow in software microservices architecture, in accordance with some embodiments.

FIG. 1 illustrates an exemplary microservices flow in software microservices architecture, in accordance with some embodiments. Shown in FIG. 1 is exemplary software microservices architecture (SMA) 100 that may include microservices 102*a*, 102*b*, 102*c*, and 102*d*. The SMA 100 shown in FIG. 1 is exemplary and does not limit the number of microservices. Each microservice of the microservices 102*a*-102*d* may be assigned a service-id. The service-id identifies the microservice in the SMA. The microservices 102*a*, 102*b*, 102*c*, and 102*d* may be assigned service-ids Service 126*a*, Service 126*b*, Service 126*c*, and Service 126*d* respectively. The service-ids 126*a*-126*d* may be numeric or alphanumeric.

In SMA, a microservice is a module implementing business functionality with interfaces to communicate with other microservices as well as entities outside the SMA network. The microservices are loosely coupled services, with each microservice providing or implementing a different functionality. Therefore, a first microservice may be a client of a second microservice where the first microservice is provided a service by the second microservice. In one example, a second microservice may provide database related services. Accordingly, any microservice that may require access to the database would be a client of the second microservice. Accordingly, a call flow, i.e., a flow of messages exchanged between a client sending a request message to a microservice of the SMA and receiving a response from the microservice of the SMA would also include messages exchanged between the microservices of the SMA. Therefore, each microservice in a call flow may be identified based on the service-id assigned to the microservice, when the messages exchanged between the microservices include service-id information in the messages.

In SMA, microservices 102*a*-102*d* may be implemented using different programming languages and may use different infrastructure. The microservices 102*a*-102*d* may use various mechanisms or protocols to communicate with each other. By way of non-limiting example, the microservices may use hypertext transfer (HTTP) protocol. A secure version of the HTTP protocol (HTTPS) may also be used. The microservices may use the HTTP/HTTPS protocol to exchange web services messages using, for example, service oriented architecture protocol (SOAP), representational state transfer (REST), etc. Accordingly, messages exchanged between the microservices using the SOAP/REST over the HTTP/HTTPS protocol may have various headers that may identify a source endpoint and a destination endpoint, a user agent, timestamp, a source and a destination IP address or a fully qualified domain name (FQDN) etc.

In some embodiments, in SMA, many microservices together provide a required service or functionality. Therefore, the microservices providing the required service or functionality may be either grouped together or distributed to achieve the best performance. In some embodiments, the microservices are called together. If the client device is required to make multiple requests to collect complete information from the microservices, it may result in inefficient and slow network performance. This is because making multiple network round trips is more time consuming and error prone than making a single request. Further, aggregating the results from multiple service requests requires additional time and computing resources. Accordingly, if the microservices share common entities, the microservices may be grouped together in order to provide better bulk processing capabilities. Similarly, if a response time to a request from a client for a single microservice varies drastically based on the request or endpoint pattern, the microservice should be split to improve response time. Thus, the microservices may be grouped together or distributed and may be installed on one or more servers. In other words, not all microservices required for the service or functionality may be required to be installed or deployed on a single server. The microservices may be distributed to achieve best performance.

In some embodiments, in SMA, one or more microservices may be designated as a gateway microservice. The gateway microservice may provide one or more endpoints to which a client device may send a request message to receive a service provided by the microservices. The one or more endpoints then may process the received request message to forward one or more messages to other microservices. The one or more messages to the other microservices may be generated by the gateway microservice based on the received request message from the client device.

By way of a non-limiting example, the client device may be a smart phone, a mobile phone, a laptop, a tablet, a personal computer, a desktop, a server, etc. The microservices may be installed, for example, on a web server or an application server. The web server or the application server may be an Apache Tomcat server, a WebLogic server, etc.

As shown in FIG. 1, an application request message 110 may be originated from a client device (not shown in FIG. 1) and received at the microservice service 102a. The microservice 102a may be a gateway service and may provide one or more endpoints to receive application request messages from client devices. A gateway service is a microservice between client devices sending application request messages to the microservices of the SMA. Application request messages from the client devices to the gateway service are received via a channel, which may have two or more endpoints. An endpoint is thus controlled by the microservice to which it is connected. Characteristics of the endpoint may include schema of the messages being received or sent through the endpoint, and an address such as an IP address used to receive or send messages.

In some embodiments, the application request message 110 may be a web service message according to Service Oriented Architecture Protocol (SOAP), or Representational State Transfer (REST). The application request message may also use hypertext transfer protocol (HTTP) or hypertext transfer protocol secure (HTTPS). Application request message 110 using the HTTP, HTTPS, SOAP, and/or REST may include various message headers, for example, Host, Content-Type, Content-Length, etc. Accordingly, the application request message 110 may include various headers. Additionally, new headers may also be added to the messages that are being exchanged between various microservices and with the client devices. An example of a request message and a response message with various headers, including the TraceId header, is shown below.

A portion of an exemplary HTTP request message is shown below. A new customized header, TraceId may be added to the message while sending the HTTP request message to other microservices.
GET/doc/account.html HTTP/1.1
Host: www.mytestservice.com
Accept: image/gif, image/jpeg, */*
Accept-language: en-us
User-Agent: Mozilla/4.0
Content-Length: 40
TraceId: ServiceId1,ServiceId2

A portion of an exemplary HTTP response message is shown below. A new customized header, TraceId may be added to the message while sending the HTTP response message to other microservices and/or the client devices.
HTTP/1.1 200 OK
Server: Apache/1.3.29 (Win32)
Accept-Ranges: bytes
Content-Length: 50
TraceId: ServiceId1,ServiceId2

In some embodiments, the application request message 110 from the client device may be received at one endpoint of the one or more endpoints of the microservice service 102a. The application request message 110 may include various headers as described above. In addition to various headers, the application request message 110 may include other data identifying a service requested by the client device from the SMA 100. The gateway service, i.e., the microservice service 102a, may process the application request message 110 and identify that microservice 102b may be invoked. The microservice service 102a therefore may build another request message 112 based on the application request message 110. The microservice service 102a may add a new customized header to a client request message 112.

In some embodiments, for example, a new customized header named TraceId may be added to client request message 112. The TraceId header's value may be set to an identification of the microservice that processed the application request message and/or the client request message. Similarly, microservices may add the TraceId header while building a response message to the application request message and/or client request message with the value of the TraceId header set to the identification of the microservice. Accordingly, the microservice 102a may add the TraceId header to the client request message 112 with the value set to an identification of the microservice 102a 126a to indicate that microservice 102a is required for the service or functionality requested by the client device.

In some embodiments, when the client request message 112 received by the microservice 102b, the microservice service 102b may process the client request message 112. The microservice 102c may be a service providing database related services. Accordingly, while processing the client request message 112, if the microservice 102b requires database related services, the microservice 102b may invoke the microservice 102c. Accordingly, the microservice 102b may build a client request message 114 to send to the microservice 102c. The client request message 114 may therefore be based on the client request message 112.

For example, the microservice 102b may include TraceId header 112a with its value from the client request message 112 in the client request message 114, and also update the value of the TraceId header in the client request message 114 to further include identification of the microservice 102b 126b. Accordingly, the TraceId header 114a may have a value set to "ServiceId1,ServiceId2" in the client request message 114. In some embodiments, for example, the identification of the microservice 102a 126a and the identification of the microservice 102b 126b may be comma separated. However, other separator such as ";" or "|" or whitespace, or like of it may also be used, e.g., "ServiceId1; ServiceId2" or "ServiceId1;ServiceId2" or "ServiceId1 ServiceId2" or like of it.

The microservice 102c may process the client request message 114 and return a client response message 116 to the microservice 102b. The microservice 102c may include TraceId header from the client request message 114 in the response message 116. The TraceId header 116a in the client response message 116 may therefore include the identification of the microservice 102a 126a and the identification of the microservice 102b 126b. The microservice 102c may further include the identification of the microservice 102c 126c in the client response message 116.

The client response message 116 when received by the microservice 102b, the microservice 102b may determine that no more microservice is required to be invoked. Accordingly, the microservice 102b may build the client response message 122. The microservice 102b may extract value of the TraceId header 116a from the client response message 116, which may include the identification of the microservices 102a, 102b, and 102c, which are 126a, 126b, and 126c. The microservice 102b may build the client response message 122 that may include the TraceId header with its (not shown in FIG. 1) set to the identification of the microservices 102a, 102b, 102c, which are 126a, 126b, and 126c. Because the identification of the microservice 102b is already present in the value of the TraceId header, the identification of the microservice 102b may not be added again. The client response message 122 may then be forwarded to the microservice service 102a.

Based on the value of the TraceId header of the client response message 122, the microservice 102a may determine that for the particular service or functionality requested corresponding to the application request message 110, microservices 102a, 102b, and 102c are required services.

In some embodiments, for example, the microservice 102b may determine, upon receipt of the client response message 116, that the microservice 102d is required to be invoked in accordance with a business logic or functionality provided by the microservice 102b. Accordingly, the microservice 102b may build a client request message 118 having a TraceId header 118a with its value set to the value of the TraceId header from the client response message 116. Because the identification of the microservice 102b is already present in the value of the TraceId header, the identification of the microservice 102b 126b may not be added again to the TraceId header 118a. The microservice 102d may build a client response message 120 similar to the microservice 102c. Therefore, similar to the microservice 102c, the microservice 102d may include TraceId header 120a that may include the identification of the microservices 102a, 102b, 102c, and 102d, which are 126a, 126b, 126c, and 126d. When the client response message 120 is received by the microservice 102b, based on the business logic or functionality provided by the microservice 102b, the microservice 102b may determine that no other microservice is further required to be invoked. Accordingly, the microservice 102b may build the client response message 122 with the TraceId header 122a with its value set to the identifications of the 102a, 102b, 102c, and 102d, which are 126a, 126b, 126c, and 126d. The microservice 102a may therefore determine that for the particular service or functionality requested in the application request message 110 may requires services from the microservices 102a, 102b, 102c, and 102d. The microservice 102a may then build the application response message 124 with TraceId header 124a with its value set to the identifications 126a, 126b, 126c, and 126d.

The microservice service 102a may determine the microservices required to be invoked for each application client request message, which may or may not be similar to the application request message 110. In other words, each client request message similar to the application request message 110 may differ in the values set for various headers of the application request message. Accordingly, the microservices which are required to provide services according to the application request messages may be deployed together and/or deployed on the same server, which may result in reduced latency and improved performance of the network and the SMA.

In some embodiments, for example, the microservice 102a may record messages sent to other microservices and received from the other microservices for later analysis to generate a deployment scheme. The messages may be recorded in a database or a log file. The recorded messages may be analyzed to generate the deployment scheme. The deployment scheme may be dependent on application specific criteria discussed below.

Figure 2:
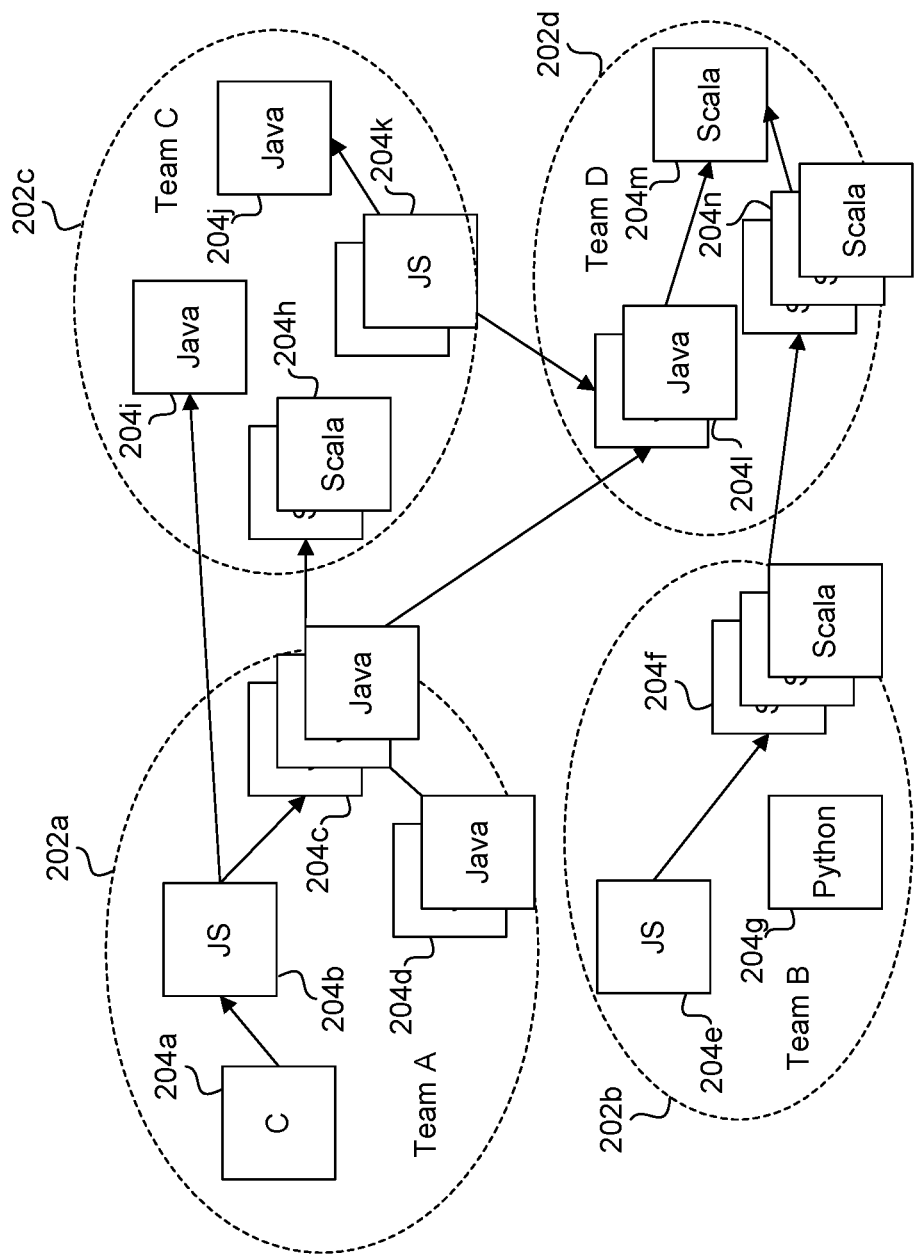
FIG. 2 illustrates an exemplary microservices development flow, in accordance with some embodiments.

FIG. 2 illustrates an exemplary microservices development flow, in accordance with some embodiments. As described earlier, in SMA, microservices are loosely coupled modules that together provide service or functionality. Since microservices are modules, each module may be developed and deployed independently. Further, each module may be developed for a specific functionality; the modules may be developed faster and deployed faster because each module supports a small piece of the functionality provided by the modules as a collection, which is a substantial advantage of the SMA. Thus, modular or microservices design in SMA may be domain driven, and technology stack agnostic as shown in FIG. 2. Particularly, by way of non-limiting example, four teams, a team A 202a, a team B 202b, a team C 202c, and a team D 202d are shown in FIG. 2. The team A 202a, the team B 202b, the team C 202c, and the team D 202d may each be developing a microservice. For example, each team 202a, 202b, 202c, and 202d may be developing one of the microservices from 102a, 102b, 102c, and 102d. Each team may include developers for developing the microservices using different technology, programming language, and/or a framework. By way of non-limiting example, the team A 202a may have a sub-team 204a developing microservices using the C programming language, a sub-team 204b using the Java Script programming language, and sub-teams 204c and 204d using the Java programming language. Similarly, the team B 202b may have a sub-team 204e developing microservices using Java Script, a sub-team 204f using Scala and a sub-team 204g using Python. The team C 202c may have sub-teams 204h using the Scala, 204i and 204j using the Java programming language, and 204k using the Java Script programming language. The team D 202d may have sub-teams 204l, 204m, and 2004n using the Java programming language, Scala, and Scala respectively. Further, in some embodiments, for example, as shown in FIG. 2, the team C 202c may depend on software delivery and/or an interface from the team A 202a, and the team D 202d may depend on software delivery and/or an interface from the teams A 202a, B 202b, and C 202c. Since microservices are modules, each module or microservice may be scaled up/down independent of the other microservices, and may also be delivered and deployed independent of the other microservices.

Figure 3:
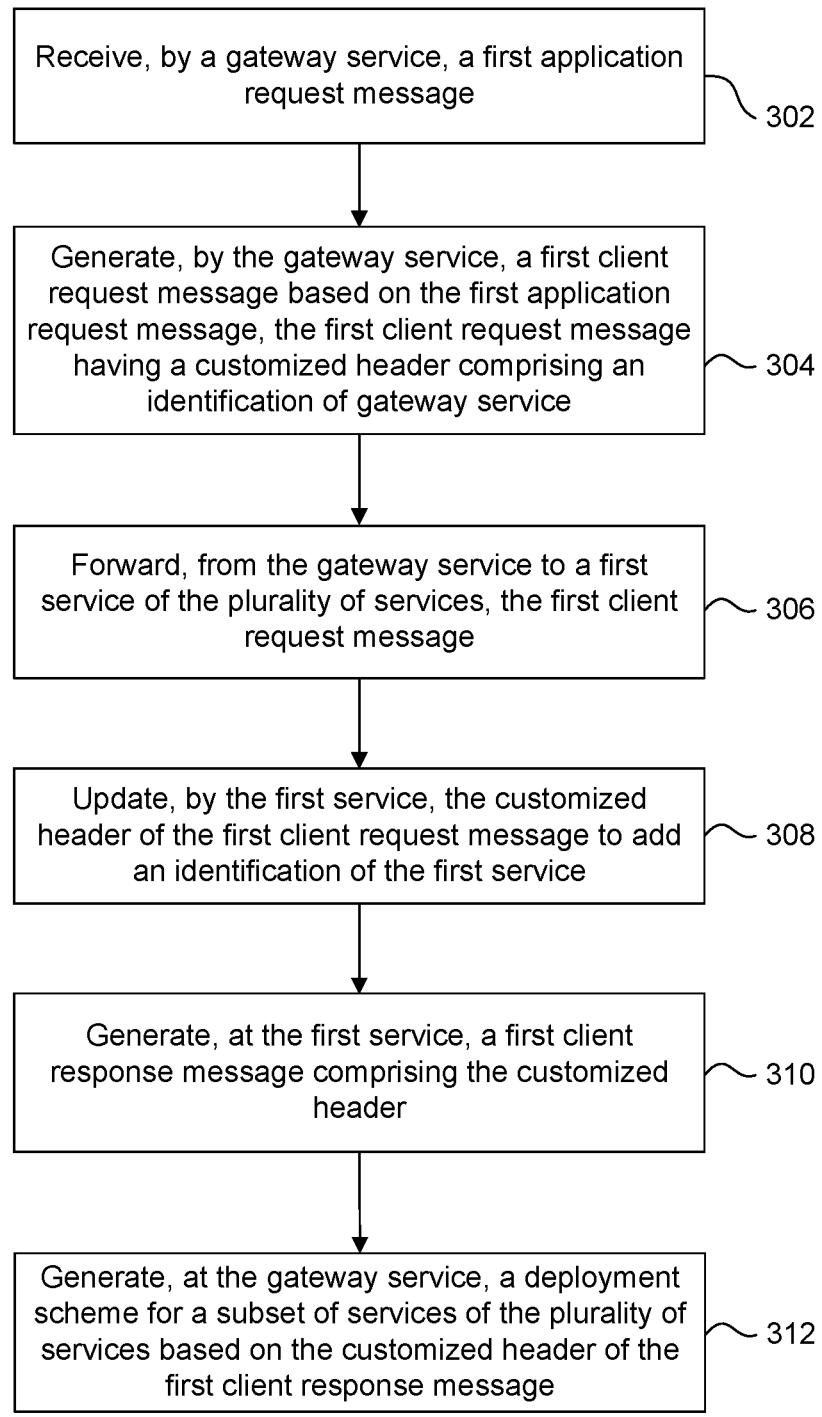
FIG. 3 illustrates a flow chart of method steps for automatic identification of service boundaries based on system optimization using distributed tracing data, in accordance with some embodiments.

FIG. 3 illustrates a flow chart of method steps for automatic identification of service boundaries based on system optimization using distributed tracing data, in accordance with some embodiments. At step 302, a first application request message may be received by a gateway service. For example, the microservice 102a may be the gateway service as described above. The first application request message may be similar to the application request message 110 described above. The first application request message being similar to the application request message 110 means that the headers and message content may be different and the value of the headers may be set according to the first application request message received at an endpoint of the gateway service. As described above, the endpoint is a channel via which the messages are communicated or exchanged between the client and the microservice.

In some embodiments, at step 304, upon receipt of the first application request message at the endpoint of the gateway service, a first client request message based on the first application request message may be generated. The gateway service processes the first application request message according to the business logic corresponding to the requested service or functionality by the first application request message. Upon processing the first application request message, the gateway service may determine that the requested service of functionality requires invocation of service from other microservice(s). Accordingly, the gateway service may generate the first client request message from the first application request message. To identify which other microservices may be invoked corresponding to the first application request message, the gateway service may add a new customized header in the first client request message.

In some embodiments, for example, the new customized header may be named TraceId. The TraceId header may be set to a value of an identification of the gateway service. Accordingly, the TraceId header may indicate which microservices processed requests and responses corresponding to the first application request message. The first application request message and the first client request message may further be associated based on a unique identification. The first application request message may include a universal unique identifier (UUID) header. The value of the UUID header may uniquely identify the first application request message among plurality of similar other messages received at the endpoint of the gateway service. Accordingly, all request messages and response messages generated by various microservices may include the UUID header with the value set to the value of the UUID header in the first application request message.

In some embodiments, each microservices may record the request and response messages that were received and sent respectively. The messages may be recorded in a text file or in a database. The text file may be a log file. Accordingly, the messages may be recorded in the log file in the database, which may be local to the microservice or centralized. If the messages are recorded at a centralized database or logging system, the microservice may communicate to the centralized database or logging system over network interface using, for example, TCP/IP, UDP, and/or application programming interface (API) messages. By way of a non-limiting example, the microservice may record the endpoint of the microservice at which the message is received, a source address, an incoming timestamp corresponding to receipt of the request, an outgoing timestamp corresponding to another request/response message, the UUID header value, the TraceId header value, etc.

In some embodiments, at step 306, the gateway service may forward the first client request message to a first service of the plurality of services. The first service of the plurality of services may be the microservice service 102b, and the first client request message may be the client request message 112. As described above, the client request message 112 may include the TraceId header with its value set to the identification of the gateway service.

In some embodiments, at step 308, as described above, the first service may process the received first client request message 112. The microservice 102b may determine that no other microservice is required to be invoked based on processing of the first client request message 112. The microservice 102b then may update the TraceId header value to add identification of the microservice 102b, and may generate a first client response message 122 at step 310. The microservice 102b may include the updated TraceId header in the first client response message 122. The first client response message 122 may then be sent by the microservice 102b to the gateway service 102a. The microservice 102b may record the received first client request message 112 and the first client response message 122 sent from the microservice 102b to the gateway service 102a. The gateway service may receive the first client response, and as described above may record the received first client response.

In some embodiments, at step 312, the gateway service 102a may generate a deployment scheme for a subset of services of the plurality of services based on the TraceId header value of the first client response message 122. As described above, the TraceId header value in the first client response may indicate all the microservices invoked in response to the receipt of the first application request message 110. The deployment scheme may be generated based on application specific criteria as described below.

In some embodiments, the application specific criteria may recommend determining a set of services, which are common to a plurality of application request messages to be deployed together. By way of non-limiting example, if the plurality of application request messages comprises messages of a first application request message type and a second application request message type, the microservices which are commonly invoked by the first application request message type and the second application request message type may be deployed together. The message type may be associated with a service or functionality. Therefore, messages from various client devices requesting the service or the functionality may generate messages that may have similar message structure, but the value assigned to the headers may be different based on the client device requesting the service or the functionality.

In some embodiments, the application specific criteria may recommend determining a set of microservices being called together corresponding to the first application request message to be deployed together.

In yet another embodiment, the application specific criteria may recommend determining a message load over a configurable time period for a set of services, and generating a recommendation that the set of service be deployed according to the message load over the configurable time period. If the particular set of services is being invoked for all the messages received at endpoints of the gateway service, and which for example consumes substantial processing power, deploying such service with other services may adversely affect performance of the other services. Accordingly, specification of a server, i.e., CPU, memory, and other specification, may be considered in generating a recommendation of how the services may be deployed.

As described above, the endpoint is a channel via which a microservice may exchange messages with the client devices and/or other microservices. Accordingly, the microservice may disclose a plurality of endpoints at which requests from the client devices and other microservices may be received. If it may be identified by the gateway service, based on the analysis of the recorded request messages and response by various microservices, at least one endpoint of the plurality of endpoints does not share common resource with other endpoints, the deployment scheme may be generated which may recommend that the at least one endpoint be decoupled from the other endpoints of the plurality of endpoints. The application specific criteria thus may include updating the set of services together and/or deploying the set of service together.

Figure 4:
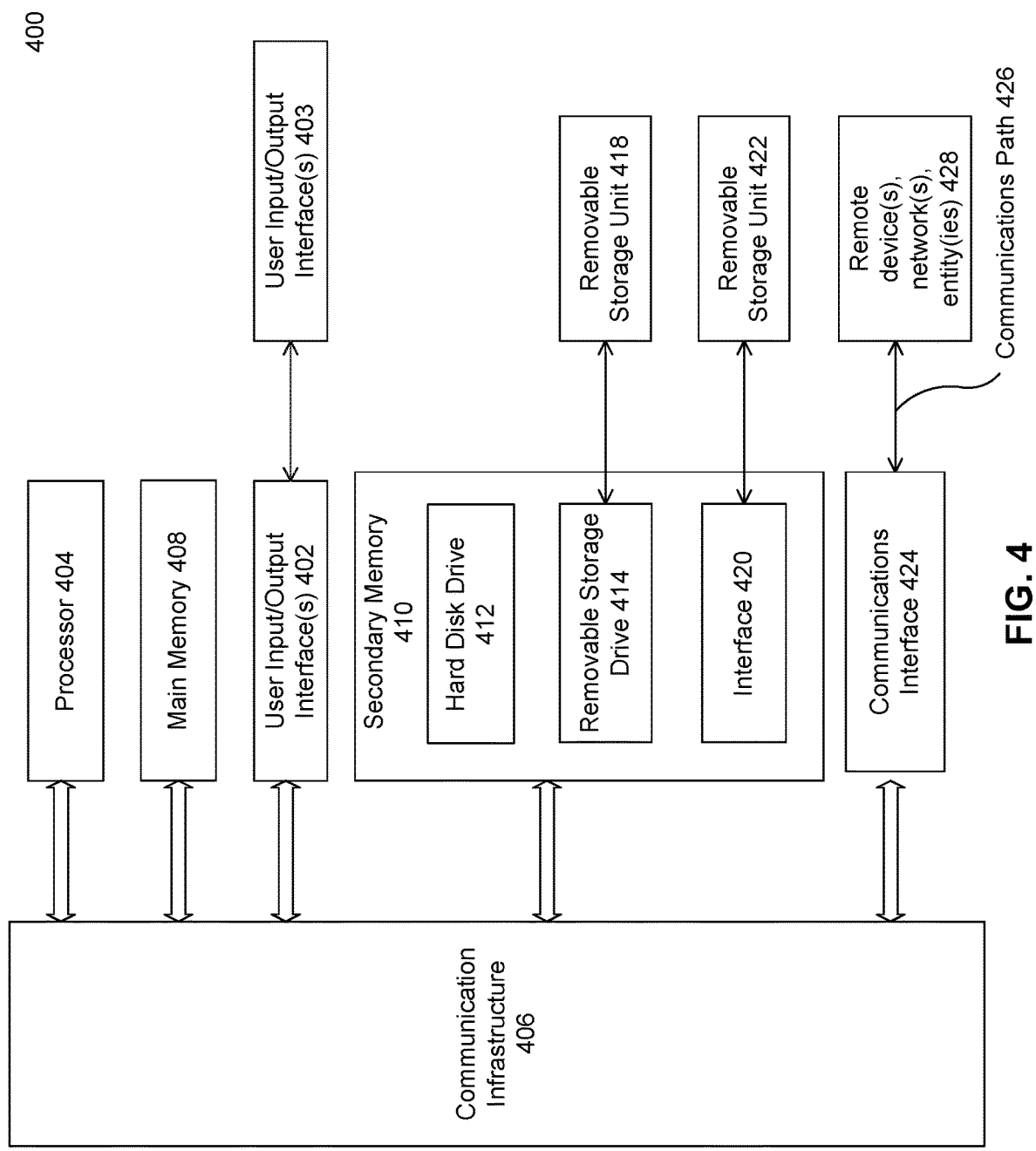
FIG. 4 illustrates an exemplary computer system, in accordance with some embodiments.

FIG. 4 illustrates an example of a computer system, in accordance with some embodiments.

Various embodiments may be implemented, for example, using one or more well-known computer systems, such as a computer system 400 as shown in FIG. 4. One or more computer systems 400 may be used, for example, to implement any of the embodiments discussed herein, as well as combinations and sub-combinations thereof.

The computer system 400 may include one or more processors (also called central processing units, or CPUs), such as a processor 404. The processor 404 may be connected to a communication infrastructure or bus 406.

The computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 400 may also include a main or primary memory 408, such as random access memory (RAM). Main memory 408 may include one or more levels of cache. Main memory 408 may have stored therein control logic (i.e., computer software) and/or data.

The computer system 400 may also include one or more secondary storage devices or memory 410. The secondary memory 410 may include, for example, a hard disk drive 412 and/or a removable storage device or drive 414. The removable storage drive 414 may be a floppy disk drive, a magnetic tape drive, a compact disk drive, an optical storage device, tape backup device, and/or any other storage device/drive.

The removable storage drive 414 may interact with a removable storage unit 418. The removable storage unit 418 may include a computer usable or readable storage device having stored thereon computer software (control logic) and/or data. The removable storage unit 418 may be a floppy disk, magnetic tape, compact disk, DVD, optical storage disk, and/any other computer data storage device. The removable storage drive 414 may read from and/or write to removable storage unit 418.

The secondary memory 410 may include other means, devices, components, instrumentalities or other approaches for allowing computer programs and/or other instructions and/or data to be accessed by the computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 400 may further include a communication or network interface 424. The communication interface 424 may enable the computer system 400 to communicate and interact with any combination of external devices, external networks, external entities, etc. (individually and collectively referenced by reference number 428). For example, the communication interface 424 may allow the computer system 400 to communicate with the external or remote devices 428 over communications path 426, which may be wired and/or wireless (or a combination thereof), and which may include any combination of LANs, WANs, the Internet, etc. Control logic and/or data may be transmitted to and from the computer system 400 via the communication path 426.

The computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

The computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 400, the main memory 408, the secondary memory 410, and the removable storage units 418 and 422, as well as tangible articles of manufacture embodying any combination of the foregoing. Such control logic, when executed by one or more data processing devices (such as the computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for microservices architecture optimization, the method comprising:
   receiving, by a gateway service, a first application request message;
   generating, by the gateway service, a first client request message based on the first application request message, the first client request message having a first header value that identifies the gateway service;
   forwarding, from the gateway service to a first service of a plurality of services, the first client request message;
   in response to forwarding the first client request message, generating, at the first service, a first client response message comprising a first header that includes the first header value updated to include an identification of the first service; and
   generating, at the gateway service, a scheme for deploying a subset of services of the plurality of services based on the first header value of the first client response message and an application specific criteria.

2. The method of claim 1, further comprising:
   in response to forwarding the first client request message, generating, at the first service, a second client request message having the first header and the first header value that includes the identification of the first service and an identification of the gateway service;
   forwarding, from the first service to a second service of the plurality of services, the second client request message;
   generating, at the second service, a second client response message, the second client response message comprising the first header of the second client request message, the first header value updated to include an identification of the second service; and
   forwarding, from the second service to the first service, the second client response message.

3. The method of claim 2, wherein the generating the scheme for deploying comprises:
   identifying a set of services being called together corresponding to the first application request message.

4. The method of claim 2, wherein the generating the scheme for deploying comprises:
   identifying a set of services common to the first application request message and a second application request message of a plurality of application request messages.

5. The method of claim 2, wherein the generating the scheme for deploying comprises:
   determining a message load over a configurable time period for a set of services; and
   generating a recommendation that the set of services be deployed according to the message load over the configurable time period.

6. The method of claim 1, wherein the generating the scheme for deploying comprises:
   identifying at least one endpoint of a plurality of endpoints on the first service that shares no common resource with other endpoints of the plurality of endpoints; and
   generating a recommendation that the at least one endpoint is decoupled from the other endpoints of the plurality of endpoints.

7. The method of claim 1, wherein the application specific criteria comprise one of updating the set of services together, and deploying the set of services together.

8. A system, comprising:
   a memory for storing operations; and
   one or more processors, communicatively coupled to the memory, configured to perform the operations comprising:
   receiving, by a gateway service, a first application request message;
   generating, by the gateway service, a first client request message based on the first application request message, the first client request message having a first header value that identifies the gateway service;
   forwarding, from the gateway service to a first service of a plurality of services, the first client request message;
   in response to forwarding the first client request message, generating, at the first service, a first client response message comprising a first header that includes the first header value updated to include an identification of the first service; and
   generating, at the gateway service, a scheme for deploying a subset of services of the plurality of services based on the first header value of the first client response message and an application specific criteria.

9. The system of claim 8, wherein the operations further comprise:
   in response to forwarding the first client request message, generating, at the first service, a second client request message having the first header and the first header value that includes the identification of the first service and an identification of the gateway service;

forwarding, from the first service to a second service of the plurality of services, the second client request message;

generating, at the second service, a second client response message, the second client response message comprising the first header of the second client request message, the first header value updated to include an identification of the second service; and forwarding, from the second service to the first service, the second client response message.

10. The system of claim 9, wherein for the generating the scheme for deploying, the operations further comprise:

identifying a set of services being called together corresponding to the first application request message.

11. The system of claim 9, wherein for the generating the scheme for deploying, the operations further comprise:

identifying a set of services common to the first application request message and a second application request message of a plurality of application request messages.

12. The system of claim 9, wherein for the generating the scheme for deploying, the operations further comprise:

determining a message load over a configurable time period for a set of services; and generating a recommendation that the set of services to be deployed according to the message load over the configurable time period.

13. The system of claim 9, wherein for the generating the scheme for deploying, the operations further comprise:

identifying at least one endpoint of a plurality of endpoints on the first service that shares no common resource with other endpoints of the plurality of endpoints; and generating a recommendation that the at least one endpoint is decoupled from the other endpoints of the plurality of endpoints.

14. The system of claim 8, wherein the application specific criteria comprise one of updating the set of services together, and deploying the set of services together.

15. A non-transitory, tangible computer-readable device having instructions stored thereon that, when executed by at least one computing device, causes the at least one computing device to perform operations comprising:

receiving, by a gateway service, a first application request message;

generating, by the gateway service, a first client request message based on the first application request message, the first client request message having a first header value that identifies the gateway service;

forwarding, from the gateway service to a first service of a plurality of services, the first client request message;

in response to forwarding the first client request message, generating, at the first service, a first client response message comprising a first header that includes the first header value updated to include an identification of the first service; and generating, at the gateway service, a scheme for deploying a subset of services of the plurality of services based on the first header value of the first client response message and an application specific criteria.

16. The non-transitory, tangible computer-readable device of claim 15, wherein operations further comprise:

in response to forwarding the first client request message, generating, at the first service, a second client request message having the first header and the first header value that includes the identification of the first service and an identification of the gateway service;

forwarding, from the first service to a second service of the plurality of services, the second client request message;

generating, at the second service, a second client response message, the second client response message comprising the first header of the second client request message, the first header value updated to include an identification of the second service; and forwarding, from the second service to the first service, the second client response message.

17. The non-transitory, tangible computer-readable device of claim 16, wherein for the generating the scheme for deploying, the operations further comprise:

identifying a set of services being called together corresponding to the first application request message.

18. The non-transitory, tangible computer-readable device of claim 16, wherein for the generating the scheme for deploying, the operations further comprise:

identifying a set of services common to the first application request message and a second application request message of a plurality of application request messages.

19. The non-transitory, tangible computer-readable device of claim 16, wherein for the generating the scheme for deploying, the operations further comprise:

determining a message load over a configurable time period for a set of services; and generating a recommendation that the set of services to be deployed according to the message load over the configurable time period.

20. The non-transitory, tangible computer-readable device of claim 16, wherein for the generating the scheme for deploying, the operations further comprise:

identifying at least one endpoint of a plurality of endpoints on the first service that shares no common resource with other endpoints of the plurality of endpoints; and generating a recommendation that the at least one endpoint is decoupled from the other endpoints of the plurality of endpoints.

* * * * *